(12) United States Patent
Baer et al.

(10) Patent No.: US 9,507,825 B2
(45) Date of Patent: Nov. 29, 2016

(54) TECHNIQUES FOR PARTITION PRUNING BASED ON AGGREGATED ZONE MAP INFORMATION

(71) Applicant: Oracle International Corporation, Redwood Shores, CA (US)

(72) Inventors: Hermann Baer, San Mateo, CA (US); Mohamed Ziauddin, Pleasanton, CA (US); Ananth Raghavan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 14/245,909

(22) Filed: Apr. 4, 2014

(65) Prior Publication Data

US 2015/0286681 A1    Oct. 8, 2015

(51) Int. Cl.
*G06F 17/30*    (2006.01)

(52) U.S. Cl.
CPC ... *G06F 17/30486* (2013.01); *G06F 17/30339* (2013.01); *G06F 17/30463* (2013.01)

(58) Field of Classification Search
CPC .................. G06F 17/30486; G06F 17/30463; G06F 17/30339
See application file for complete search history.

(56) References Cited

U.S. PATENT DOCUMENTS

| | | | |
|---|---|---|---|
| 6,484,179 B1 | 11/2002 | Roccaforte | |
| 6,636,870 B2 | 10/2003 | Roccaforte | |
| 6,662,174 B2 | 12/2003 | Shah et al. | |
| 6,732,115 B2 | 5/2004 | Shah et al. | |
| 6,748,394 B2 | 6/2004 | Shah et al. | |
| 6,778,996 B2 | 8/2004 | Roccaforte | |
| 6,785,666 B1 | 8/2004 | Nareddy et al. | |
| 6,804,714 B1 | 10/2004 | Tummalapalli | |
| 6,865,575 B1 | 3/2005 | Smith et al. | |
| 6,898,608 B2 | 5/2005 | Hopeman et al. | |
| 6,920,640 B2 | 7/2005 | Hsu et al. | |
| 6,941,311 B2 | 9/2005 | Shah et al. | |
| 6,973,457 B1 | 12/2005 | Bastawala et al. | |
| 7,007,029 B1 | 2/2006 | Chen | |
| 7,028,046 B2 | 4/2006 | Anjur et al. | |
| 7,031,953 B2 | 4/2006 | Shah et al. | |
| 7,072,897 B2 | 7/2006 | Shah et al. | |
| 7,076,507 B1 | 7/2006 | Tarin | |
| 7,080,090 B2 | 7/2006 | Shah et al. | |
| 7,089,331 B1 | 8/2006 | Gollapudi et al. | |

(Continued)

OTHER PUBLICATIONS

Birmingham, "Zone Maps and data power", Jul. 11, 2011, IBM Netezza Underground Blogs, downloaded from internet, pp. 1-7.*

(Continued)

*Primary Examiner* — Rehana Perveen
*Assistant Examiner* — Alexander Khong
(74) *Attorney, Agent, or Firm* — Hickman Palermo Becker Bingham LLP; Adam C. Stone

(57) ABSTRACT

Techniques for partition pruning based on aggregated zone map information. In one embodiment, for example, a method for pruning partitions based on aggregated zone map information comprises: receiving a query statement comprising a filter predicate on a column of a database table; and pruning one or more partitions of the database table from access paths for processing the query statement based on determining, based on aggregated zone map information associated with the one or more partitions, that the filter predicate cannot be satisfied by data stored in the one or more partitions.

27 Claims, 9 Drawing Sheets

(56) References Cited

U.S. PATENT DOCUMENTS

| | | |
|---|---|---|
| 7,093,194 B2 | 8/2006 | Nelson |
| 7,103,590 B1 | 9/2006 | Murthy et al. |
| 7,133,951 B1 | 11/2006 | Bourekas |
| 7,143,098 B2 | 11/2006 | Chen et al. |
| 7,167,859 B2 | 1/2007 | Shah et al. |
| 7,228,300 B2 | 6/2007 | Lei et al. |
| 7,233,952 B1 | 6/2007 | Chen |
| 7,287,022 B2 | 10/2007 | Netz et al. |
| 7,313,559 B2 | 12/2007 | Netz et al. |
| 7,315,849 B2 | 1/2008 | Bakalash et al. |
| 7,320,001 B1 | 1/2008 | Chen |
| 7,333,982 B2 | 2/2008 | Bakalash et al. |
| 7,346,617 B2 | 3/2008 | Wong |
| 7,366,730 B2 | 4/2008 | Greenfield et al. |
| 7,373,353 B2 | 5/2008 | Adler et al. |
| 7,379,944 B2 | 5/2008 | Adler et al. |
| 7,383,275 B2 | 6/2008 | Chen et al. |
| 7,389,283 B2 | 6/2008 | Adler |
| 7,389,284 B1 | 6/2008 | Surlaker et al. |
| 7,392,248 B2 | 6/2008 | Bakalash et al. |
| 7,415,457 B2 | 8/2008 | Dombroski et al. |
| 7,418,438 B2 | 8/2008 | Gould et al. |
| 7,433,886 B2 | 10/2008 | Rathakrishnan |
| 7,437,372 B2 | 10/2008 | Chen et al. |
| 7,480,662 B2 | 1/2009 | Postapov et al. |
| 7,480,663 B2 | 1/2009 | Colossi et al. |
| 7,502,894 B2 | 3/2009 | Luo |
| 7,505,888 B2 | 3/2009 | Legault et al. |
| 7,558,779 B2 | 7/2009 | Luo |
| 7,593,955 B2 | 9/2009 | Legault et al. |
| 7,610,300 B2 | 10/2009 | Legault et al. |
| 7,610,351 B1 | 10/2009 | Gollaapudi et al. |
| 7,617,235 B2 | 11/2009 | Srinivasan et al. |
| 7,617,312 B2 | 11/2009 | Tummalapalli |
| 7,657,503 B1 | 2/2010 | Cormode et al. |
| 7,657,516 B2 | 2/2010 | Zaman et al. |
| 7,660,823 B2 | 2/2010 | Clover |
| 7,685,092 B2 | 3/2010 | Reichert et al. |
| 7,689,621 B1 | 3/2010 | Huber et al. |
| 7,707,143 B2 | 4/2010 | Bruce et al. |
| 7,716,167 B2 | 5/2010 | Colossi et al. |
| 7,716,172 B2 | 5/2010 | Anjur et al. |
| 7,765,246 B2 | 7/2010 | Basu et al. |
| 7,769,733 B2 | 8/2010 | Chen et al. |
| 7,774,379 B2 | 8/2010 | Basu et al. |
| 7,779,038 B2 | 8/2010 | Adler et al. |
| 7,814,104 B2 | 10/2010 | Raghavan et al. |
| 7,831,615 B2 | 11/2010 | Bailey |
| 7,836,082 B2 | 11/2010 | Adler et al. |
| 7,860,891 B2 | 12/2010 | Adler et al. |
| 7,873,664 B2 | 1/2011 | Andersche et al. |
| 7,873,684 B2 | 1/2011 | Sounder et al. |
| 7,890,546 B2 | 2/2011 | Shah et al. |
| 7,895,191 B2 | 2/2011 | Colossi et al. |
| 7,904,327 B2 | 3/2011 | Phelan et al. |
| 7,930,200 B1 | 4/2011 | McGuirtk et al. |
| 7,949,674 B2 | 5/2011 | Middelfart |
| 7,966,322 B2 | 6/2011 | Clover |
| 7,966,330 B2 | 6/2011 | Raghavan et al. |
| 7,979,425 B2 | 7/2011 | Garg et al. |
| 7,996,378 B2 | 8/2011 | Wang et al. |
| 8,000,996 B1 | 8/2011 | Sanli et al. |
| 8,001,112 B2 | 8/2011 | Dombroski |
| 8,041,670 B2 | 10/2011 | Bakalash et al. |
| 8,051,102 B2 | 11/2011 | Everett |
| 8,065,262 B2 | 11/2011 | Bailey |
| 8,082,239 B2 | 12/2011 | Yang et al. |
| 8,126,871 B2 | 2/2012 | Malloy et al. |
| 8,131,533 B2 | 3/2012 | Legault et al. |
| 8,135,688 B2 | 3/2012 | Shankar et al. |
| 8,150,850 B2 | 4/2012 | Herrnstadt |
| 8,160,917 B1 | 4/2012 | Solanki et al. |
| 8,161,085 B2 | 4/2012 | Souder et al. |
| 8,170,984 B2 | 5/2012 | Bakalash et al. |
| 8,195,602 B2 | 6/2012 | Bakalash et al. |
| 8,195,645 B2 | 6/2012 | Thiebaut-George |
| 8,200,612 B2 | 6/2012 | Soylemez et al. |
| 8,209,280 B2 | 6/2012 | Kearney et al. |
| 8,209,294 B2 | 6/2012 | Shankar et al. |
| 2002/0095421 A1 | 7/2002 | Koskas |
| 2003/0126143 A1 | 7/2003 | Roussopoulos |
| 2003/0195898 A1 | 10/2003 | Agarwal et al. |
| 2004/0153435 A1 | 8/2004 | Gudbjartsson et al. |
| 2004/0177065 A1 | 9/2004 | Tropf |
| 2005/0004936 A1 | 1/2005 | Potapov |
| 2005/0038784 A1* | 2/2005 | Zait ............... G06F 17/30312 |
| 2005/0044102 A1 | 2/2005 | Gupta et al. |
| 2005/0102467 A1 | 5/2005 | Lam et al. |
| 2006/0253429 A1* | 11/2006 | Raghavan ......... G06F 17/30492 |
| 2007/0041718 A1 | 2/2007 | Fontijn |
| 2007/0061287 A1 | 3/2007 | Le et al. |
| 2007/0078813 A1 | 4/2007 | Beavin |
| 2008/0059408 A1* | 3/2008 | Barsness ........... G06F 17/30545 |
| 2010/0235344 A1* | 9/2010 | Chandrasekar ... G06F 17/30935 |
| | | 707/713 |
| 2010/0235348 A1* | 9/2010 | Baby ................ G06F 17/30911 |
| | | 707/715 |
| 2010/0257181 A1 | 10/2010 | Zhou |
| 2010/0281017 A1* | 11/2010 | Hu .................... G06F 17/30477 |
| | | 707/718 |
| 2012/0109888 A1* | 5/2012 | Zhang ............... G06F 17/30584 |
| | | 707/610 |
| 2012/0117054 A1 | 5/2012 | Shrinivas |
| 2012/0290588 A1 | 11/2012 | Egan |
| 2013/0151491 A1 | 6/2013 | Gislason |
| 2013/0198165 A1 | 8/2013 | Cheng |

OTHER PUBLICATIONS

U.S. Appl. No. 13/629,907, filed Sep. 28, 2012, Office Action, May 22, 2014.

U.S. Appl. No. 13/629,897, filed Sep. 28, 2012, Office Action, Jun. 19, 2014

U.S. Appl. No. 13/629,907, filed Sep. 28, 2012, Notice of Allowance, Dec. 1, 2014.

Oracle, "Oracle7 Server Concepts", Release 7.3, dated Feb. 1996, 178 pages.

O'Neil et al., "The Star Schema Benchmark and Augmented Fact Table Indexing", dated Aug. 24, 2009, 16 pages.

IBM, "Best Practices Physical Database Design for Data Warehouse Environments", dated 2012, 70 pages.

IBM DB2 Universal Database, "Administration Guide: Planning", IBM, dated Jan. 1, 2004, 102 pages.

Chen et al., "Adjoined Dimension Colum Clustering to Improve Data Warehouse Query Performance", data engineering, dated 2008, IEEE, 4 pages.

Bhattacharjee et al., "Efficient Query Processing for Multi-Dimensionally Clustered Tables in DB2", Proceedings 2003 VLDB Conference, dated Jan. 1, 2003, 12 pages.

U.S. Appl. No. 13/629,897, filed Sep. 28, 2012, Final Office Action, Jan. 4, 2016

Abadi, D. et al., "Column-Stores vs. Row-Stores: How Different Are They Really?" *Sigmod* 2008(14 pages).

Dijcks, Jean-Pierre, "A Not So fabulous New Release (The Data Warehouse Insider)", dated Aug. 30, 2009, 9 pages.

Netezza Database Software Technology, "A partial Overview of Netzza Database Software Technology", dated Jun. 21, 2010, 12 pages.

Ronthal, Adam, "Appliances Are Easy to Use", Blog, dated Mar. 27, 2012, 3 pages.

Snow, Dwaine, "FUD Competitors are Spreading on Netezza", dated Jun. 28, 2012, 3 pages.

Howard, Philip, "Netezza: More Than You Might Imagine", Bloor Research, dated Oct. 3, 2006, 6 pages.

DB Technology, "Netezza Questions and Answers", dated Aug. 2, 2009, 5 pages.

DBMS 2: DataBase Management System Services, "Netezza vs. Conventional Data Warehousing RDBMS", dated Sep. 20, 2006, 8 pages.

(56) References Cited

OTHER PUBLICATIONS

Big Data Topics, "Using nz_Zonemap to Visualize Netezza's Zone Map Effectiveness", dated Jul. 20, 2012, 5 pages.

NZGuv, Netezza Tips, Tricks and Cool SQL, "With Netezza Always Use Integer Join Keys for Good Compression, Zone Maps, and Joins" dated Nov. 20, 2010, 1 page.

Birmingham, David, "Netezza Underground", "Zone Maps and Data Power", dated Jul. 11, 2011, 5 pages.

U.S. Appl. No. 13/629,897, filed Sep. 28, 2012, Office Action, Oct. 5, 2015

Battacharjee et al., "Efficient Query Processing for Multi-Dimensionally Cluster Tables in DB2", Proceedings dated 2003, VLDB Conference, dated Jan. 1, 2013, 12 pages.

* cited by examiner

TECHNIQUES FOR PARTITION PRUNING BASED ON AGGREGATED ZONE MAP INFORMATION

CROSS-REFERENCE TO RELATED APPLICATIONS

This application is related to the following application(s): U.S. application Ser. No. 13/629,897, filed Sep. 28, 2012, entitled "CLUSTERING A TABLE IN A RELATIONAL DATABASE MANAGEMENT SYSTEM"; and U.S. application Ser. No. 13/629,907, filed Sep. 28, 2012, entitled "PRUNING DISK BLOCKS OF A CLUSTERED TABLE IN A RELATIONAL DATABASE MANAGEMENT SYSTEM". The disclosures of each of the foregoing applications are hereby incorporated by reference in their entirety, including any appendices or attachments thereof, for all purposes.

FIELD OF THE INVENTION

The present invention relates generally to data processing environments and, more particularly, to computer-implemented techniques for partition pruning based on aggregated zone map information.

BACKGROUND

Computers are powerful tools for storing and accessing vast amounts of information.

Computer databases are a common mechanism for storing information on computer systems. A typical database is organized collections of related information stored as "records" having "fields" of information. As an example, a database of sales may have a record for each sale where each record contains fields designating specifics about the sale, such as identifier, price, shipping address, order date, ship date, etc. An organized collection of related information in a database is sometimes referred to as a table having rows and columns. The rows of a table correspond to records and the columns of the table corresponds to fields.

Between the actual physical database itself (i.e., the data actually stored on a storage device) and the users of the system, a database management system or DBMS is typically provided as a software intermediary or layer. Typically, all requests from users to access database data are processed by the DBMS. For example, information may be added or removed from data files, information retrieved from or updated in such files, and so forth.

A fundamental challenge in designing any DBMS is to provide the ability to users to quickly select a small subset of a large volume of database data. For example, a manager of a chain of retail stores may be interested in selecting information about sales that occurred on a particular date in a particular one of the stores from among historical sales data collected from all of the retail stores over the past five years. Typically, approaches for improving the performance of highly selective database queries include adding additional indexes on selected tables and/or partitioning selected tables.

Partitioning is the ability of a DBMS to decompose a very large table and associated indexes into smaller and more manageable pieces called partitions. A column or group of columns may be used to determine the partition in which a particular row of data is stored. The column or the group of columns used for this purpose is sometimes called the partitioning key.

More recently, approaches for improving the performance of highly selective database queries include clustering and using zone maps. Clustering refers to storing related data of a table in a sorted order in contiguous on-disk data blocks. A zone map is then added to index the clustered data as stored on-disk. Specifically, the zone map divides the clustered data into contiguous on-disk "regions" or "zones" of contiguous data blocks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Computer-implemented techniques for partition pruning based on aggregated zone map information are disclosed. The claims section at the end of this document provides a useful summary of some embodiments of the present invention.

DETAILED DESCRIPTION

Glossary

Figure 1:
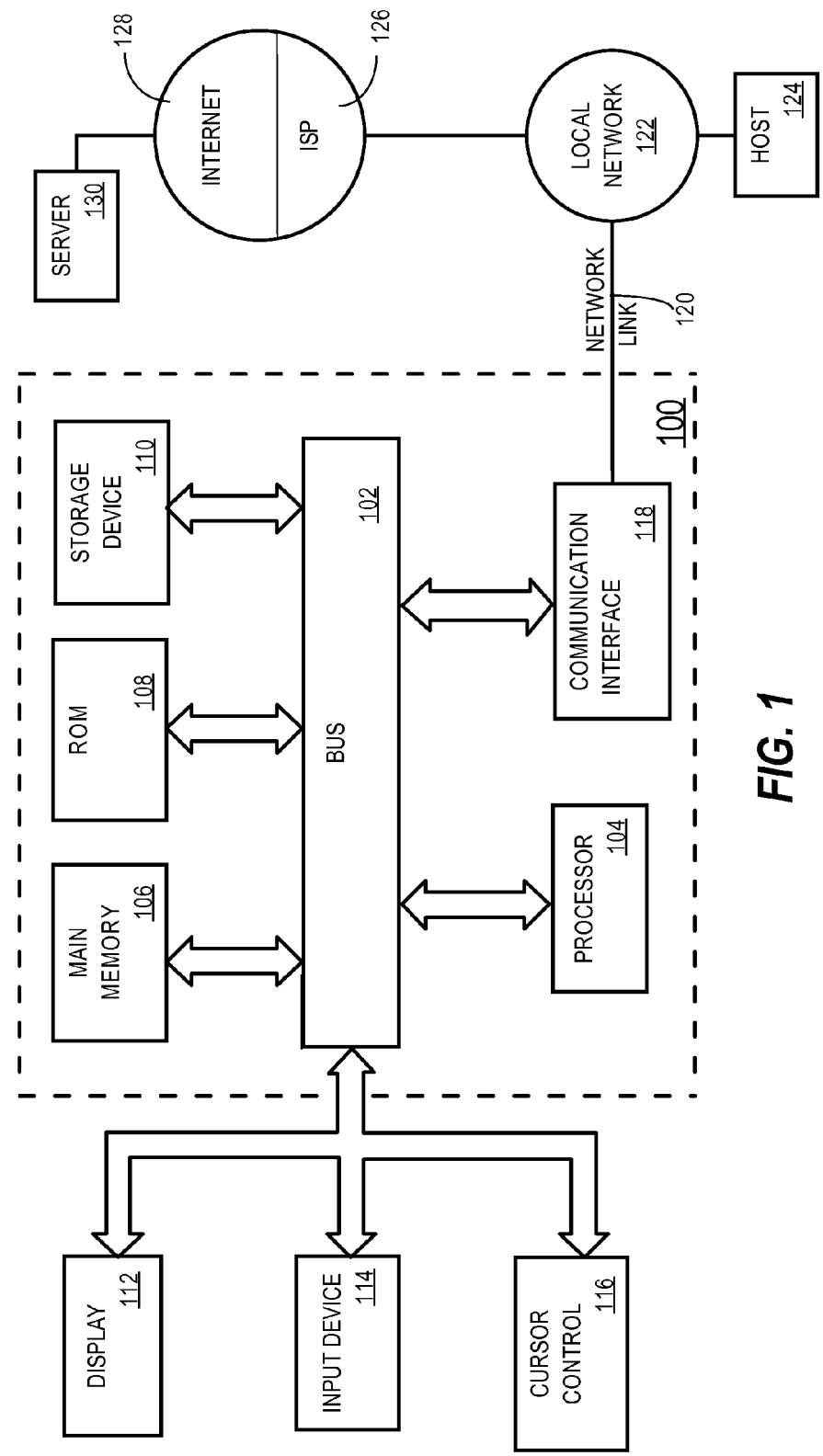
FIG. 1 is a block diagram of a computer system in which some embodiments of the present invention may be implemented.

The following definitions are offered for purposes of illustration, not limitation, in order to assist with understand the discussion that follows.

Access path—The term access path is used to refer generally to an interface between the query engine and the storage layer of a DBMS.

Data block—Sometimes referred to as a logical block, a block, or a page. A data block corresponds to an enumerated number of contiguous bytes within an address space (an address space may be logical or physical) within persistent memory, such as disk storage or flash disk.

DBMS—The term DBMS refers to a database management system.

Execution plan—Sometimes referred to as a query plan. An execution plan is the combination of steps used by a DBMS to execute a query.

Extent—A level of logical database storage space above a data block. An extent is a specific number of data blocks within a contiguous address space allocated for storing a specific type of information.

Query—An operation that retrieves data from tables or views. For example, SELECT*FROM employees expresses a query operation for retrieving data from table "employees".

Query engine—A component of a DBMS, which typically includes, among other possible components, a parser, an optimizer, and an execution engine. The parser converts the text of a query into a query tree and imposes syntactic correctness. The optimizer chooses the most efficient means of executing the query. The execution engine carries out an execution plan for executing the query.

Query execution—Sometimes referred to as query processing. Query execution includes all phases of query evaluation including parsing, optimization, execution, and result generation.

Schema—A named collection of database objects, including logical structures such as tables and indexes.

Schema object—A logical structure of data stored in a schema. Examples of schema objects are tables, indexes, and partitions.

Segment—A level of logical database storage space above a data block. A segment is a set of extents or a set of data blocks, each of which has been allocated for a specific data structure. For example, data of a table, an index, or a partition may be stored in its own segment.

SQL—Stands for Structured Query Language. SQL is a nonprocedural language to access a relational database.

Storage layer—Refers to the component of a DBMS providing services to the query engine such as running disk scans, reading data from disk into memory buffers, storing data from memory buffers to disk, and other disk operations.

Introduction

Referring to the figures, exemplary embodiments of the invention will now be described. In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention. The exemplary embodiments are primarily described with reference to block diagrams of flowcharts. As to the flowcharts, each block within the flowcharts represents both a method step and an apparatus element for performing the method step. Depending upon the requirements of the particular implementation at hand, the corresponding apparatus element may be configured in hardware, software, firmware, or combinations thereof.

Overview

Embodiments of the present invention provide a query engine capable of more efficient query processing. In particular, the query engine is able to prune entire partitions of a table from the access paths for processing a query based on filter predicates in the query on columns that are not columns of the partitioning key used for partitioning the table. To do this, the query engine leverages zone map information which has been aggregated on per-partition basis. More specifically, minimum and maximum column values from zone maps for each zone of a partition are aggregated, or "rolled-up", and associated with the partition. If a query is received with a filter predicate on a column whose minimum and maximum zone map values have been aggregated for a partition, then the query engine can determine based on the column value (or the range of possible column values) in the filter predicate and the aggregated minimum and maximum zone map values whether the entire partition can be omitted from the access paths for processing the query. Because of the aggregated zone map information, the query engine is able to prune the partition from the access path even if the column in the filter predicate is not part of the partitioning key.

As one example, consider a table sales having order_date, ship_date, and close_date columns and which has been partitioned by month based on the values of the order_date column. Further, assume that a zone map has been constructed for the sales table based on per-zone minimum and maximum values of the ship_date and close_date columns. Neither the ship_date column nor the close_date column are columns of the partitioning key used to partition the sales table. In accordance with embodiments of the present invention, the zone map can store additional information on a per-partition basis. In particular, the zone map can store (aggregate), for each partition of the sales table, the minimum value of the ship_date column, the minimum value of the close_date column, the maximum value of the ship_date column, and the maximum value of the close_date column among all minimum and maximum values for these columns for all zones of the partition. Now, if a query is received with a filter predicate on the ship_date or close_date columns, the query engine can eliminate entire partitions from the access paths by comparing the column value (or the range of possible column values) in the filter predicate to the per-partition aggregate minimum and maximum values stored in the zone map.

In contrast, partition key-based pruning allows for partition pruning based only on query filter predicates on columns that make up the partitioning key. Returning to the above-example, it may be possible with partition key-based pruning to prune partitions of the sales table based on a filter predicate on the order_date column but not based on a filter predicate on the ship_date or close_date columns, assuming the ship_date and close_date columns are not part of the partitioning key used to partition the sales table. It should be noted that partitioning the sales table based on the values of the ship_date and close_date columns in addition to the values of the order_date column so as to facilitate partition key-based pruning may not be desirable to database administrators due to the complexities involved in partitioning a table by the values of more than one column. In contrast, the query engine of embodiments of the present invention facilitates partition pruning based on multiple columns, even where none of the multiple columns are part of the partitioning key used for partitioning the table.

With the query engine of embodiments of the present invention, partitions are prune-able in a greater number of column dimensions, so as to provide multi-dimensional partition pruning. Rather than pruning partitions based just on columns that make up the partitioning key, with the query engine of embodiments of the present invention, partitions can also be pruned based on columns on which zone maps are built. As a result, the query processing efficiencies gained by partitioning pruning can be realized for a greater number of queries, including for queries for which partitioning pruning was not previously possible.

Another benefit of aggregating zone map information on a per-partition basis is that index partitions associated with pruned table partitions may also be pruned by the query engine. In this context, index partitions associated with pruned table partitions means that the index partitioning scheme corresponds to or can be derived from the table partitioning scheme. For example, the query engine according to embodiments of the present invention enables index partitions associated with table partitions pruned based on aggregated zone map information to be omitted from the access paths, which is not possible in existing query engines which do not aggregate zone map information on a per-table partition basis. Before describing embodiments of the present invention in further detail, some background information useful for understanding the operations of embodiments of the present invention will be described.

General-Purpose Computer System

In some embodiments, the present invention is implemented on a conventional or general-purpose computer system. For example, FIG. 1 is a block diagram that illustrates a computer system 100 in which some embodiments of the present invention may be embodied. Computer system 100 includes a bus 102 or other communication mechanism for communicating information, and a hardware processor 104 coupled with bus 102 for processing information. Hardware processor 104 may be, for example, a general purpose microprocessor or a system on a chip (SoC).

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104.

A storage device 110, such as a magnetic disk, optical disk, or solid-state drive is provided and coupled to bus 102 for storing information and instructions.

Computer system 100 may be coupled via bus 102 to a display 112, such as a liquid crystal display (LCD) or other electronic visual display, for displaying information to a computer user. Display 112 may also be a touch-sensitive display for communicating touch gesture (e.g., finger or stylus) input to processor 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 may implement the techniques described herein using customized hard-wired logic, one or more application-specific integrated circuits (ASICs), one or more field-programmable gate arrays (FPGAs), firmware, or program logic which, in combination with the computer system, causes or programs computer system 100 to be a special-purpose machine. According to some embodiments, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

A software system is typically provided for controlling the operating of computer system 100. The software system, which is usually stored in main memory 106 and on fixed storage (e.g., hard disk) 110, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 100. The application(s) may be "loaded" into main memory 106 from storage 110 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computer system in accordance with instructions from OS and/or application(s). The graphical user interface also serves to display the results of operation from the OS and application(s).

Database Management System

Figure 2:
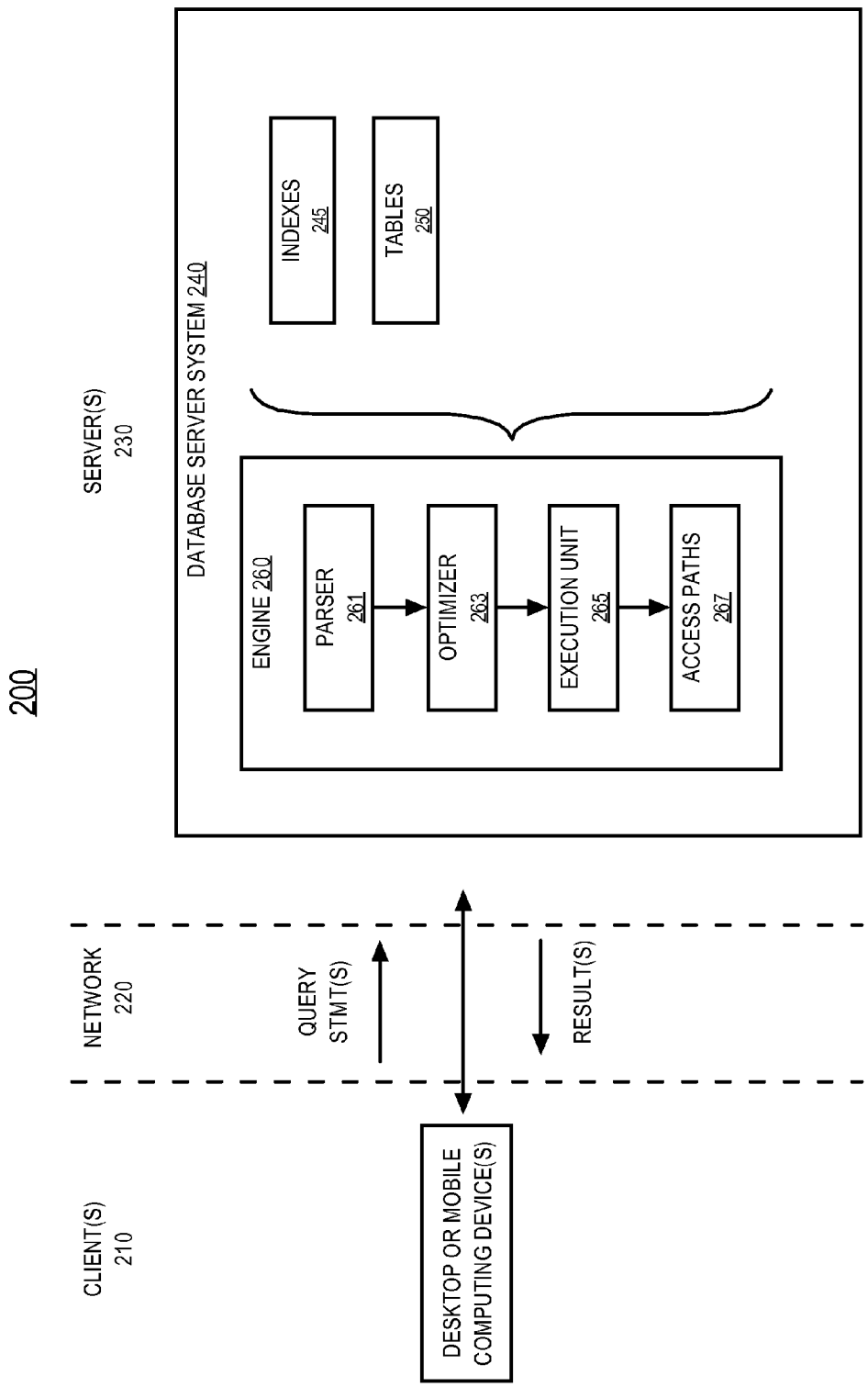
FIG. 2 illustrates general structure of a client/server database system suitable for implementing some embodiments of the present invention.

In some embodiments, the techniques of the present invention are embodied in a client/server database system. FIG. 2 illustrates general structure of a client/server database system 200 suitable for implementing some embodiments of the present invention. As shown, system 200 comprises one or more client(s) 210 connected to a server 230 via a network 220. Specifically, client(s) 210 comprise one or more computing devices 211 connected to a database server system 240 using a conventional network. In some embodiments, the computing devices 211 include one or more desktop computing devices and/or mobile computing devices. Typically, such computing devices would operate under a conventional operating system such as, for example, MICROSOFT WINDOWS, LINUX, UNIX, IOS, or ANDROID.

Database server system 240, which comprises ORACLE DATABASE (available from Oracle International Corporation of Redwood Shores, Calif.) in an exemplary embodiment, generally operates as a process or set of processes independent of the clients, running under a server operating system such as MICROSOFT WINDOWS, LINUX, or SUN SOLARIS.

Network 220 may comprise one or more wired or wireless conventional network systems, including a local area network (LAN), a wireless local area network (Wireless LAN), a Wide Area Network (WAN), and/or the Internet, as is known the art. Network 220 includes functionality for packing client network calls in the well-known structured query language (SQL) together with any parameter information into a format of one or more packets suitable for transmission to database server system 240.

In operation, client(s) 210 store data in or retrieve data from one or more database tables 250, as shown in FIG. 2. Data in a relational database is stored as a series of tables, also called relations. Typically resident on the server 230, each table itself comprises one or more "rows" or "records" (tuples). A typical database will contain many tables, each of which stores information about a particular type of entity. A table in a typical relational database may contain anywhere from a few rows to millions of rows or more. A row is divided into fields or columns; each field represents one particular attribute of the given row. A row corresponding to a sales record, for example, may include information about the sale's ID Number, Price, Shipping Address, Ship Date, and Order Date. Each of these categories, in turn, represents a database field. In the foregoing example sales table, for example, Shipping Address is one field, Ship Date is another, and so on. Each row in a table is uniquely identified by a Row ID (RID), which can be used as a pointer to a given row.

Database server system 240 may implement a database language, such as a variant of the Structured Query Language (SQL). A database language allows users and administrators to issue commands to create, manipulate, and access data stored in a relational database. Sometimes, database language statements are divided into two categories: data manipulation language (DML) statements, used to read and write data, and data definition language (DDL) statements, used to describe data and maintain the database. DML statements are also called query statements. In operation, for example, clients 210 issue one or more database language commands to server 230. Database language commands may specify, for instance, a query statement for retrieving particular data (e.g., data records meeting the query condition) from database table(s) 250. In addition to retrieving the data from database server table(s) 250, clients 210 also have the ability to issue commands to insert new rows of data records into the table(s), or to update and/or delete existing records in the table(s). Table(s) 250 may comprise materialized views, which is a schema object that stores a query result.

Database language statements are parsed to determine an "execution plan", which is the combination of steps used by the database system to execute a database language statement. In operation, database language statements received from client(s) 210 via network 220 are processed by engine 260 of database server system 240. Engine 260 comprises parser 261, optimizer 263, execution unit 265, and access paths 267. Specifically, the database language statements are passed to the parser 261 which converts the statements into a query tree—a tree data structure which represents components of the query in a format selected for the convenience of the system. In this regard, parser 261 may employ conventional parsing methodology (e.g., recursive descent parsing). Parser 261, or engine 260 generally, may normalize the query tree. Such normalization may include, for example, eliminating redundant data, error checking, or satisfying referential integrity constraints.

The normalized query tree is then passed to optimizer 263. Optimizer 263 is responsible for determining the most efficient way to execute the query considering factors affecting execution performance such as, for example, objects referenced and the conditions specified in the query. Typically, optimizer 263 performs a cost-based analysis for formulating a query execution plan. Such cost-based analysis may include, for example, selecting the join order of tables (e.g., when the query specifies a join) and selecting relevant indexes when available. Optimizer 263, therefore, performs an analysis of the query and selects the best execution plan, which in turn results in particular access paths 267 being invoked during query execution. It is possible that a given query may be answered by tens of thousands or more of access paths 267 with widely varying costs characteristics. General access paths include, but are not limited to, a full table scan (e.g., a scan of table data in which the database sequentially reads all rows from a table and filters out those that do not meet selection criteria) and an index scan (e.g., the retrieval of rows by traversing an index using the indexed column values specified in the query). Therefore, optimizer 263 must efficiently select an access path that is reasonably close to an optimal plan. Execution unit 265 translates the query execution plan selected by optimizer 263 into executable form for execution using access paths 267.

Server 230 may maintain one or more indexes 245 on tables 250 for enhancing storage, retrieval, and processing of data records.

The above-described computer hardware and software are presented for purposes of illustrating the basic underlying client and server computer components that may be employed for implementing some embodiments of the present invention. For purposes of discussion, the description herein presents examples in which it is assumed that there exists a "server" (e.g., database server) that communicates with one or more "clients" (e.g., personal computers or mobile devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the techniques of the present invention presented herein.

Clustering

Data of a partitioned table can be clustered. In the context of storing data in a DBMS, the organization of related table data in contiguous disk blocks may be referred to as "clustering". Clustering can improve performance of table scans during query processing because the table data can be scanned with sequential disk access, as opposed to random disk access which is typically slower than sequential disk access. Disk, as the term is used herein, refers to any non-volatile data storage or persistent data storage including, but not limited to, a hard disk, flash memory, a solid state disk, or an electronic disk.

There are a variety of different approaches to clustering table data in a DBMS. In one approach, rows of the table are stored on-disk in a linear order based on values of one or more columns. For example, rows of the table can be ordered by a query with an ORDER BY clause specifying one or more columns of the table and the rows stored in their sorted order on-disk in one or more contiguous disk blocks. In another approach, table data is clustered along multiple dimensions based on values in columns of the table according to a space filling curve such as a Z-order or Hilbert space filling curve. In yet another approach, table data is clustered based on values of one or more columns of one or more other tables, in addition to or instead of columns of the clustered table. For example, rows of a fact table of a star schema can be clustered based on values from one or more columns of one or more dimension tables, in addition to or instead of columns of the fact table. To do this, rows from the fact table can be joined with rows from the dimension tables and the joined rows sorted, either in a linear order and/or in a space filing curve order, based on values of columns of the dimension tables, in addition to or instead of values of columns of the fact table. The rows of the fact table are then stored in contiguous disk block on disk in the sorted order. Approaches for clustering rows of a fact table based on value of columns of dimension tables are described in detail in related U.S. application Ser. No. 13/629,897, filed Sep. 28, 2012, entitled "Clustering A Table In A Relational Database Management System", the entire contents of which is hereby incorporated by reference as if fully set forth herein.

Zone Maps

Zone maps can be constructed by a DBMS on table data, which may be clustered. The table data, and the indexes that index the table data, may also be partitioned. A zone map is a database access structure that allows the DBMS to skip disk scans of certain disk blocks of a table when scanning the table data because it is known, based on the zone map, that the skipped disk blocks cannot contain data relevant to the query for which the table scanning is being performed.

Generating a zone map for a table typically involves the DBMS dividing the contiguous disk blocks of the table data into sets of contiguous disk blocks called "zones". For each zone, the minimum and maximum values of interesting columns are determined. The interesting columns can be one or more columns of the table for which the zone map is being generated (e.g., columns of a fact table) and/or columns of other tables (e.g., columns of dimension tables).

A table for which a zone map has been generated is referred to hereinafter as a "zoned table". The "interesting" columns that a zone map maintains minimum and maximum values for are referred to hereinafter as the "zoned columns". As already mentioned, the zoned columns do not have to be, but can be, columns of the zoned table. In the case where some of the zoned columns are not columns of the zoned table (e.g., where some of the zoned columns are columns of dimension tables), it is typically expected, but not required, that the table data of the zoned table has been clustered on-disk according to values of the zoned columns. For example, techniques for pruning disk blocks of a clustered fact table using zone maps built on values of columns of dimension tables is described in greater detail in related U.S. application Ser. No. 13/629,907, filed Sep. 28, 2012, entitled "Pruning Disk Blocks Of A Clustered Table In A Relational Database Management System", the entire contents of which is hereby incorporated by reference as if fully set forth herein. Further, zoned columns not need to be, but can be, columns that are part of the partitioning key used to partition the zoned table, if the zoned table is partitioned.

When the query engine executes a query that qualifies one of the zoned columns with a filter predicate, the database server can compare the value (or the range of possible values) of the zoned column in the filter predicate to the minimum value and the maximum value of the zoned column for a zone to determine whether the zone can possibly contain data satisfying the filter predicate. If the zone cannot possibility satisfy the filter predicate, then the disk blocks of the zone may be skipped during a table scan of the zoned table. Skipping disk blocks using zone maps in this way is referred to as zone pruning.

As an example of using a zone map to facilitate zone pruning in a DBMS, consider the database table 300 of FIG.

3. The table 300 has five columns named order_key, ship_date, receipt_date, destination, and quantity. The table 300 has eight rows labeled 301-308 in FIG. 3. A practical embodiment may have many more rows numbering in the millions, billions, or more.

Figure 4:
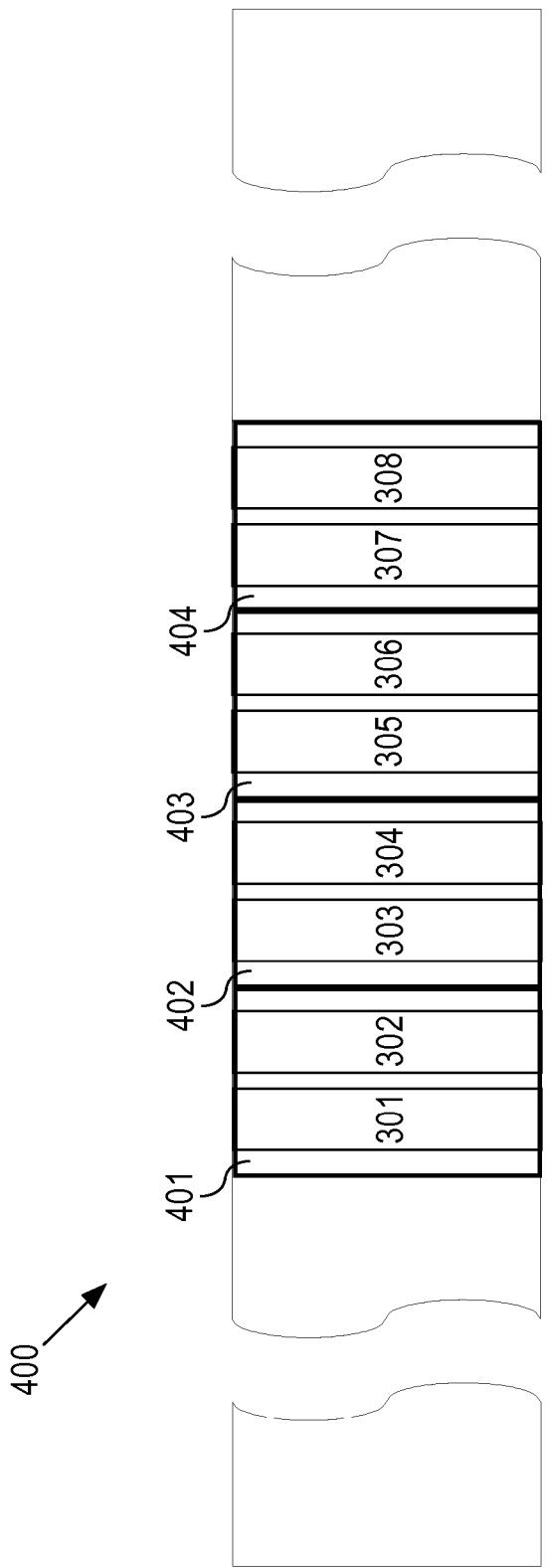
FIG. 4 is a block diagram example of a portion of a disk containing disk blocks, according to some embodiments of the present invention.

Referring now to FIG. 4, it illustrates how the rows 301-308 of table 300 may be stored on a portion of a disk 400 in a sorted order in contiguous disk blocks 401-404. The disk portion 400 may correspond to an extent, a segment, a tablespace, or other logical portion of a disk. The disk portion 400 is viewed logically by the database server as a set of separately addressable disk blocks arranged contiguously in a linear order. The disk blocks of the disk portion 400 are numbered consecutively according to their linear order by the database server.

In this example, rows 301-308 of table 300 are clustered based on the values of the ship_date column. In particular, rows 301 and 302 are stored in disk block 401, rows 303 and 304 are stored in disk block 402, rows 305 and 306 are stored in disk block 403, and rows 307 and 308 are stored in disk block 404. A practical embodiment may have more or less rows per disk block and/or have a different number of rows per disk block or have disk blocks within the table that contain different numbers of disk blocks. Further, the rows of a table may be stored in many more disk blocks numbering in the tens, hundreds, thousands, millions, or more. Further still, a disk block may store rows from more than one table.

A zone map for a table may be constructed in which each zone consists of a number of disk blocks. The maximum number of disk blocks per zone is referred to as the "scale" of the zone map. In some embodiments, the scale of a zone map is 1,024 but may be more or fewer according to the requirements of the particular implementation at hand. In addition, the zone map scale may be a user configurable parameter. Generally, the scale is a tradeoff between minimizing the number of zones per zone map, where the zone map scale is relatively large, and maximizing zone pruning efficiency, where the zone map scale is relatively small.

Figure 3:
FIG. 3 illustrates an example database table.
Figure 5:
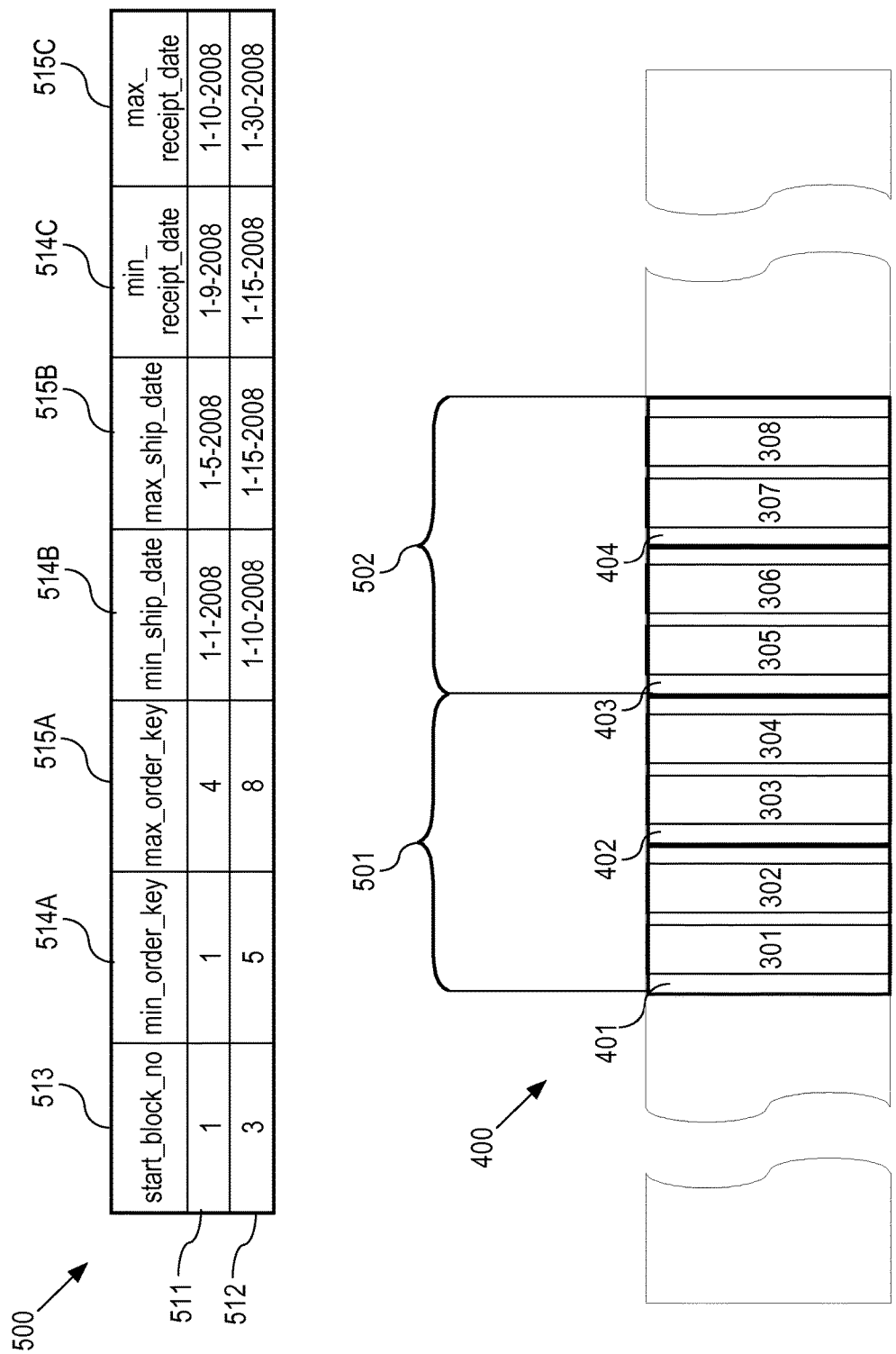
FIG. 5 is a block diagram example of a grouping contiguous disk blocks into zones using a zone map, according to some embodiments of the present invention.

Turning now to FIG. 5, it illustrates a zone map 500 on table 300 of FIG. 3. The zone map 500 may be represented as a table, materialized view, or other database object and may be stored in a database as such. In this example, for ease of illustration, the zone map scale is 2. In a practical embodiment, the zone map scale may be 1,024, for example. Continuing the current example, the four disk blocks 401-404 of FIG. 4 are divided in two zones 501 and 502 as shown in FIG. 5. Each zone 501 and 502 contains two contiguous disk blocks. In particular, zone 501 contains contiguous disk blocks 401 and 402 and zone 502 contains contiguous disk blocks 403 and 404.

Each row 511 and 512 of zone map 500 corresponds to a zone of the zone map. In particular, row 511 corresponds to zone 501 and row 512 corresponds to zone 502. The zone map 500 includes a zone disk block range column 513 specifying, for each zone, the first block in the set of contiguous disk blocks covered by the zone. More generally, the column indicates or specifies the range of contiguous disk blocks covered by a zone, for each zone of the zone map.

For example, assuming disk blocks 401-404 are consecutively numbered by the DBMS as 1, 2, 3, and 4, respectively, the values in the column 513 indicate that zone 501 covers contiguous disk blocks 401 and 402 and that zone 502 covers contiguous disk blocks 403 and 404. The columns of the zone map 500 also include a minimum value column 514 and a maximum value column 515 for each of the zoned columns on which the zone map 500 is constructed.

Based on zone map 500 and given the following query with a filter predicate on the ship_date column of table 300 of FIG. 3 with a filter predicate date value of '01-01-2008', a DBMS performing a table scan of table 300 can skip a scan of the zone 502 and disk blocks 403 and 404 because zone 502, based on the minimum and maximum values stored in columns 514B and 515B in row 512 of the zone map 500, cannot contain rows relevant to the following query.

SELECT*FROM lineitem WHERE ship_date='01-01-2008'

Partitioning a Zoned Table

Figure 6:
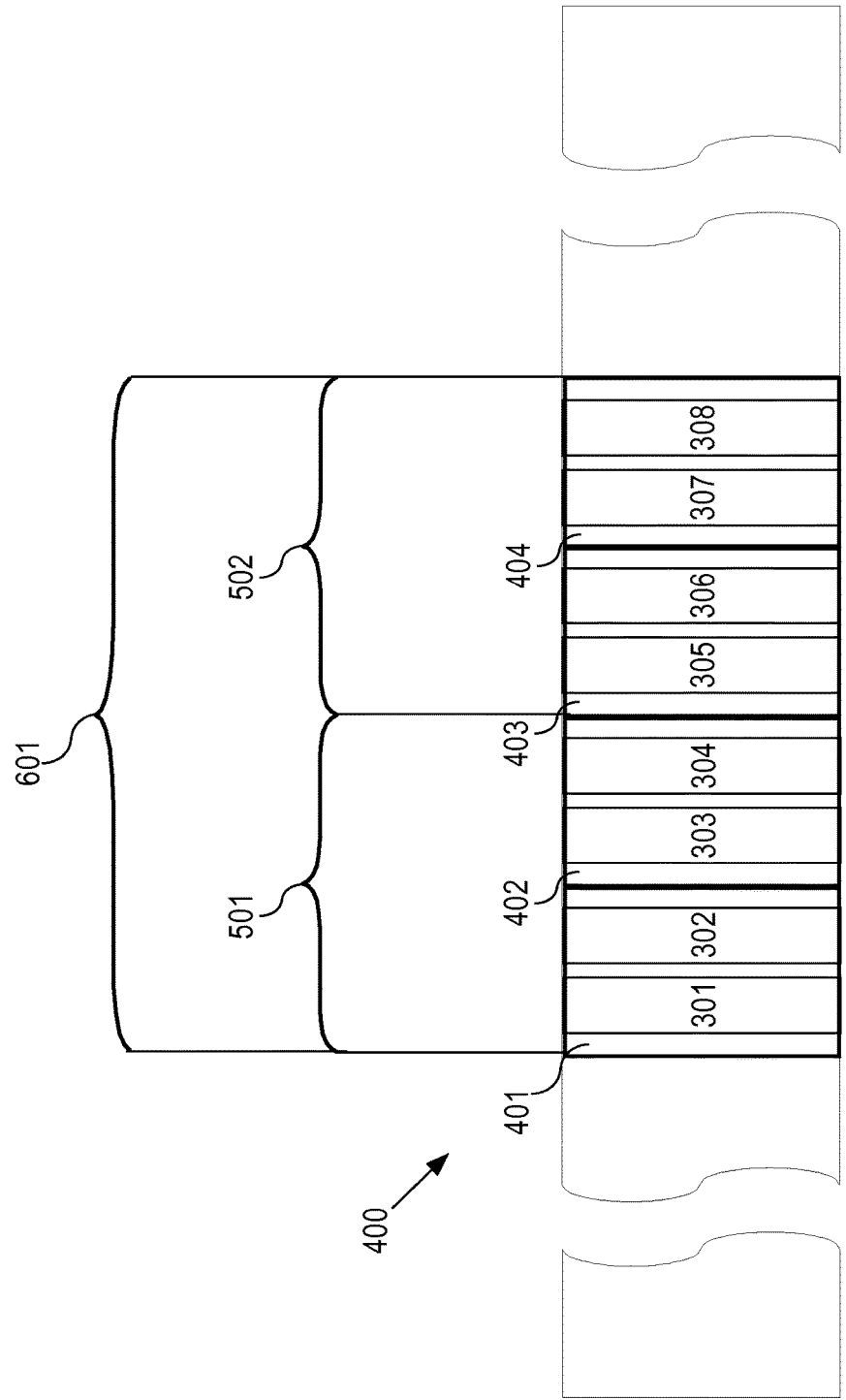
FIG. 6 is a block diagram example of partitioning a table, according to some embodiments of the present invention.

Turning now to FIG. 6, it illustrates a table partition 601 of table 300. Table partition 601 can be a list partition, a range partition, or a hash partition. Each table partition can include multiple zones of a zone map and thus multiple sets of contiguous disk blocks. In this example, table partition 601 comprises zones 501 and 502 and thus, disk blocks 401-404. In this example, for ease of illustration, table 300 is divided into only a single table partition. However, in a practical embodiment, a table is divided into multiple table partitions. Further, while all the disk blocks 401-404 of table partition 601 are stored contiguously on disk, in other embodiments, all of the disk blocks of table partition need not be stored contiguously on disk. In these embodiments, a table partition may comprise multiple sets of contiguous disk blocks where each set is not contiguous on disk. However, all of the disk blocks of a table partition, whether all contiguous on disk or not, may be stored in the same logical database storage container (e.g., in the same database segment).

System Components

Figure 7:
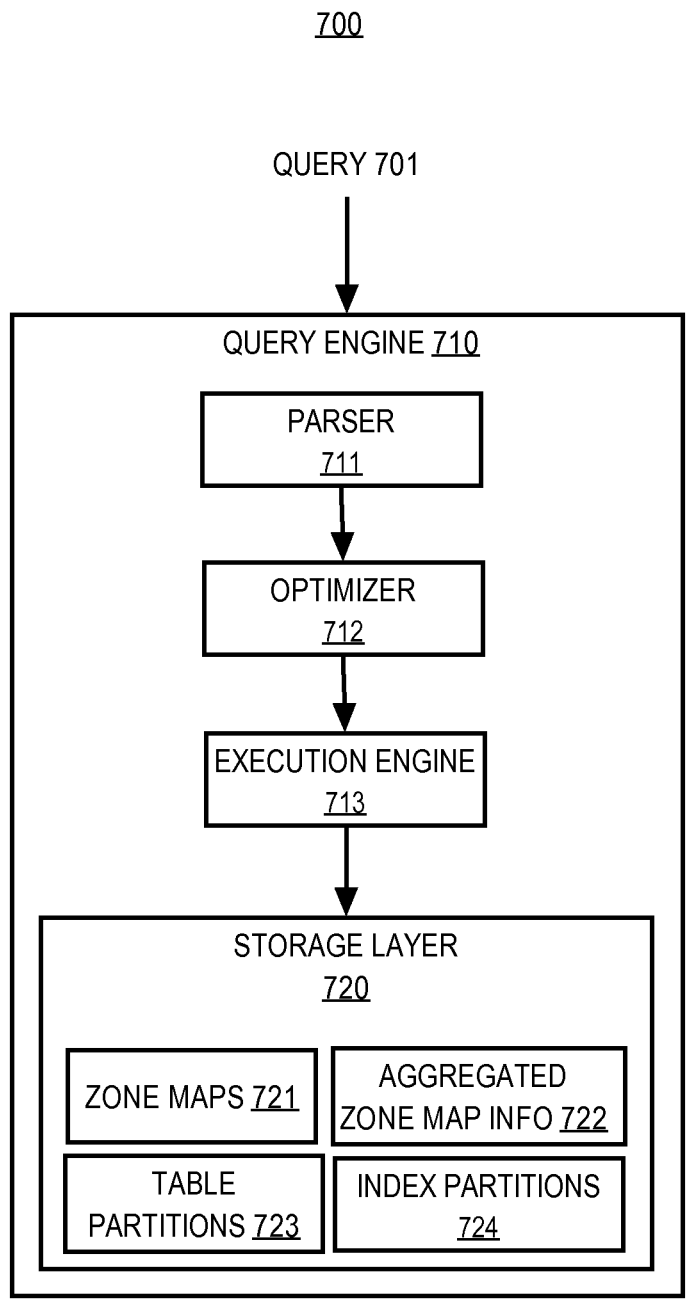
FIG. 7 is a block diagram illustrating an environment in which some embodiments of the present invention may be implemented.

FIG. 7 is a block diagram illustrating an environment 700 in which embodiments of the present invention may be embodied. Environment includes query engine 710. Query engine 710 provides mechanisms for pruning table and index partitions based on aggregated zone map information.

As shown in FIG. 7, a query 701 may be transmitted to query engine 710. For example, a user may submit the following SQL query requesting information from the database:

SELECT DISTINCT product_id from sales where order_date='12-14-2012' AND ship_date>'12-24-2012';

Query engine 710 includes parser 711, optimizer 712, and execution engine 713. Within the query engine 710, parser 711 parses the received query and converts it into a query tree representation. Query engine 710 may also include a normalizer (not shown), which may be part of the parser 711, for normalization of the query. The normalized query tree representation generated by the normalizer is then sent to optimizer 712 which generates a physical query plan (execution plan) for execution of the query. The query plan is then provided to execution engine 713 which interprets the query plan and executes it with the support of storage layer 720.

When generating the query plan, optimizer 712 may remove (i.e., prune) table partitions 723 and associated index partitions 724 from the set of possible access paths for processing the query based on aggregated zone map information 722 and filter predicates in the query. Thus, the query plan provided to execution engine 712 by optimizer 711 may reflect the results of table partition 723 and index partition 724 pruning by optimizer 711 based on aggregated zone map information 722. In some embodiments, if the query filter predicate on the zoned column contains bind variables, also known as host variables, instead of literal values, then table 723 and index 724 partitions can be dynamically pruned by execution engine 713.

As shown in FIG. 7, zone maps 721, aggregated zone map information 722, table partitions 723, and index partitions 724 are maintained in storage layer 720.

Zone maps 712 store zone map information for zoned tables about zoned columns. This zone map information includes the minimum and maximum zoned column values on a per-zone basis from among all rows of the zoned table that belong to a given zone. If some of the zoned columns for a zoned table are not columns of the zoned table, then the rows that "belong" to a given zone for the zoned table can be a set of joined rows formed by joining rows of the zoned table with rows of other tables as described in related U.S. application Ser. No. 13/629,907, filed Sep. 28, 2012, entitled "Pruning Disk Blocks Of A Clustered Table In A Relational Database Management System", the entire contents of which is hereby incorporated by reference as if fully set forth herein.

Aggregated zone map information 722 stores aggregated zone map information for zoned tables that are also partitioned tables. This aggregated zone map information includes minimum and maximum zoned column values on a per-partition basis. In particular, for a given partition of a zoned table, the smallest minimum value for each zoned column among all minimum values for the zoned column in the zone map for the zoned table among all zones that belong to the given partition is associated in aggregated zone map information 722 with an identifier of the partition. Similarly, the greatest maximum value for each zoned column among all maximum values for the zoned column in the zone map for the zoned table among all zones that belong to the given partition is associated in aggregated zone map information 722 with an identifier of the partition. The identifier of the partition may be any suitable identifier of the partition. For example, the identifier may be a name for the partition or an identifier of segment or other physical or logical disk storage unit in which partition is stored.

Figure 8:
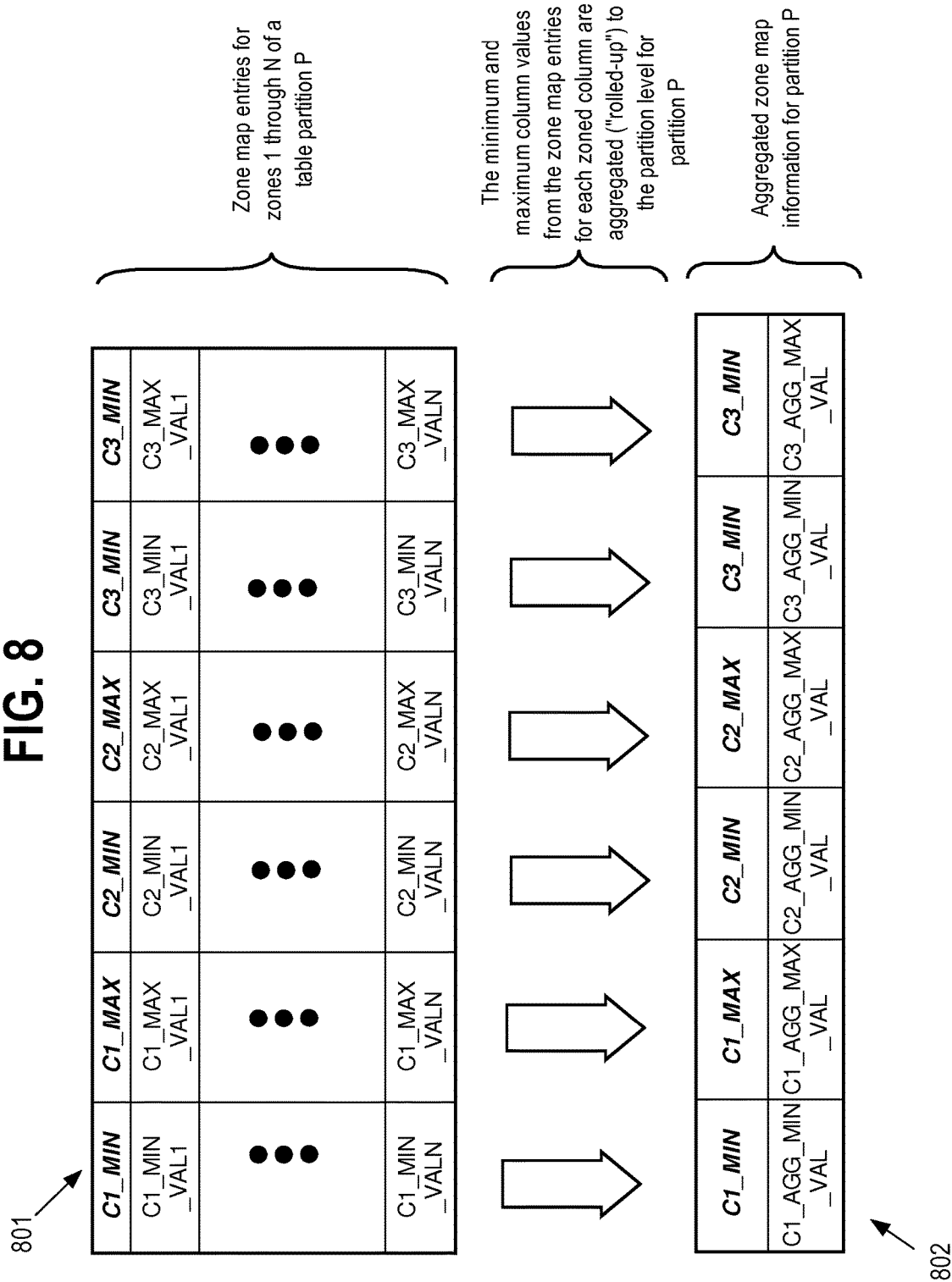
FIG. 8 is a block diagram example of aggregating zone map information for a partition, according to some embodiments of the present invention.

For example, table 801 of FIG. 8 illustrates some columns of an example zone map for a partition P of a zoned table. Specifically, table 801 includes six columns, two for each of three zoned columns C1, C2, and C3. In other embodiments, a zone map may have as few as one zoned column or more than three zoned columns. All three zoned columns C1, C2, and C2 can be columns of the zoned table. Alternatively, some or all of the zoned columns can be columns of other tables. Each row of table 801 corresponds to one zone of N zones of the zone map within the partition P. Other tables or other sub-tables (sets of rows) of a table similar to table 801 may exist for other partitions of the zoned table. Each cell of table 801, except for the cells in the first row which indicate a column name of the zone map, stores a minimum zoned column value or a maximum zoned column value for the zoned column corresponding to the cell's column in table 801 and for the zone corresponding to the cell's row in table 801. Note that, for ease of illustration, the cells in rows 2 through N−1 in table 801 are omitted. Ellipsis dots in the columns of table 801 are used in FIG. 8 to represent the omitted table cells.

Continuing the example of FIG. 8, an aggregation or roll-up operation is performed on table 801 to produce aggregated zone map information 802 for partition P. The aggregation operation may be performed when creating the zone map or when partitioning the zoned table or at another time during or after creation of the zoned entries in table 801.

The aggregation operation involves aggregating the minimum and maximum values from the zone map entries for each of the zoned columns. In particular, for a set of minimum values for a zoned column from the zone map entries for the zones that belong to a partition, the smallest minimum value of the set is determined and stored as aggregated minimum value for the zoned column to associate with the partition in the aggregated zone map information for the partition. Similarly, for a set of maximum values for a zoned column from the zone map entries for the zones that belong to a partition, the greatest maximum value of the set is determined and stored as aggregated maximum value for the zoned column to associate with the partition in the aggregated zone map information for the partition.

The zones in a zone map of a zoned table that belong to a given partition of the table can be determined based on physical and logical disk information associated with the zones and the partition. For example, the zone map entries in the zone map may include disk block identifying information that identifies the sets of contiguous disk blocks where the zones are stored on disk. Other metadata may associate disk block identifiers with segment identifiers in which partitions are stored. The zone map entries in the zone map that correspond to zones that belong to a given partition can then be determined by identifying entries on the zone map that correspond to sets of contiguous disk blocks that belong to the segment in which the given partition is stored.

When aggregating zone map information for a partition, the smallest minimum value from a set of minimum values for a zoned column from the zone map and the greatest maximum value from a set of maximum values for the zoned column from the zone map can depend on the data type of the zoned column. For example, if the data type of the zoned column is a character data type, then the smallest minimum value and the greatest maximum value can be based on a lexical ordering of column values. As another example, if the data type of the zoned column is a numerical data type, then the smallest minimum value and the greatest maximum value can be based on a numerical ordering of the zoned column values. As yet another example, if the data type of the zoned column is a date data type, then the smallest minimum value and the greatest maximum value can be based on a calendar ordering of the zoned column values.

Returning to the example of FIG. 8, zone map entries in table 801 corresponding to zones for partition P are aggregated ("rolled-up") to produce aggregated zone map information 802 for partition P. Specifically, aggregated zone map information 802 is presented in FIG. 8 in table format with one column per column of table 801. Column C1_MIN of aggregated zone map information 802 stores column value C1_AGG_MIN_VAL which is the smallest (most minimum) column value among the set of column values in column C1_MIN of table 801, column C1_MAX of aggregated zone map information 802 stores column value C1_AGG_MAX_VAL which is the greatest (most maximum) column value among the set of column values in column C1_MAX of table 801, column C2_MIN of aggregated zone map information 802 stores column value C2_AGG_MIN_VAL which is the smallest (most minimum) column value among the set of column values in column C2_MIN of table 801, column C2_MAX of aggregated zone map information 802 stores column value C2_AGG_MAX_VAL which is the greatest (most maximum) column value among the set of column values in column C2_MAX of table 801, column C3_MIN of aggregated zone map information 802 stores column value C3_AGG_MIN_VAL which is the smallest (most minimum)

column value among the set of column values in column C3_MIN of table 801, and column C3_MAX of aggregated zone map information 802 stores column value C3_AGG_MAX_VAL which is the greatest (most maximum) column value among the set of column values in column C3_MAX of table 801.

Table partitions 723 store the table data of partitioned tables. As described above, the table data of a table partition 723 may be clustered on-disk and a zone map 721 built for the table partition based on the clustered table data. Aggregated zone map information 722 may be generated for the table partition based on the zone map built for the partition.

Associated index partitions 724 belong to "local" indexes built on partitioned tables 723. A local index is an index that is partitioned using the same partition key and same key boundaries as the partitioned table. Each partition of a local index will only contain keys and row identifiers from its corresponding table partition. Local indexes are typically b-tree or bitmap indexes. Local indexes support partition independence, meaning that partitions and associated local index partitions can be managed individually and separate from other partitions and associated local index partitions.

Sample Operation

The following description presents method steps that may be implemented using processor-executable instructions, for directing operation of a device under processor control. The processor-executable instructions may be stored on a non-transitory computer-readable medium, such as CD, DVD, hard disk, flash memory, or the like. The processor-executable instructions may also be stored as a set of downloadable processor-executable instructions, for example, for downloading and installation from an Internet location (e.g., a Web site).

Figure 9:
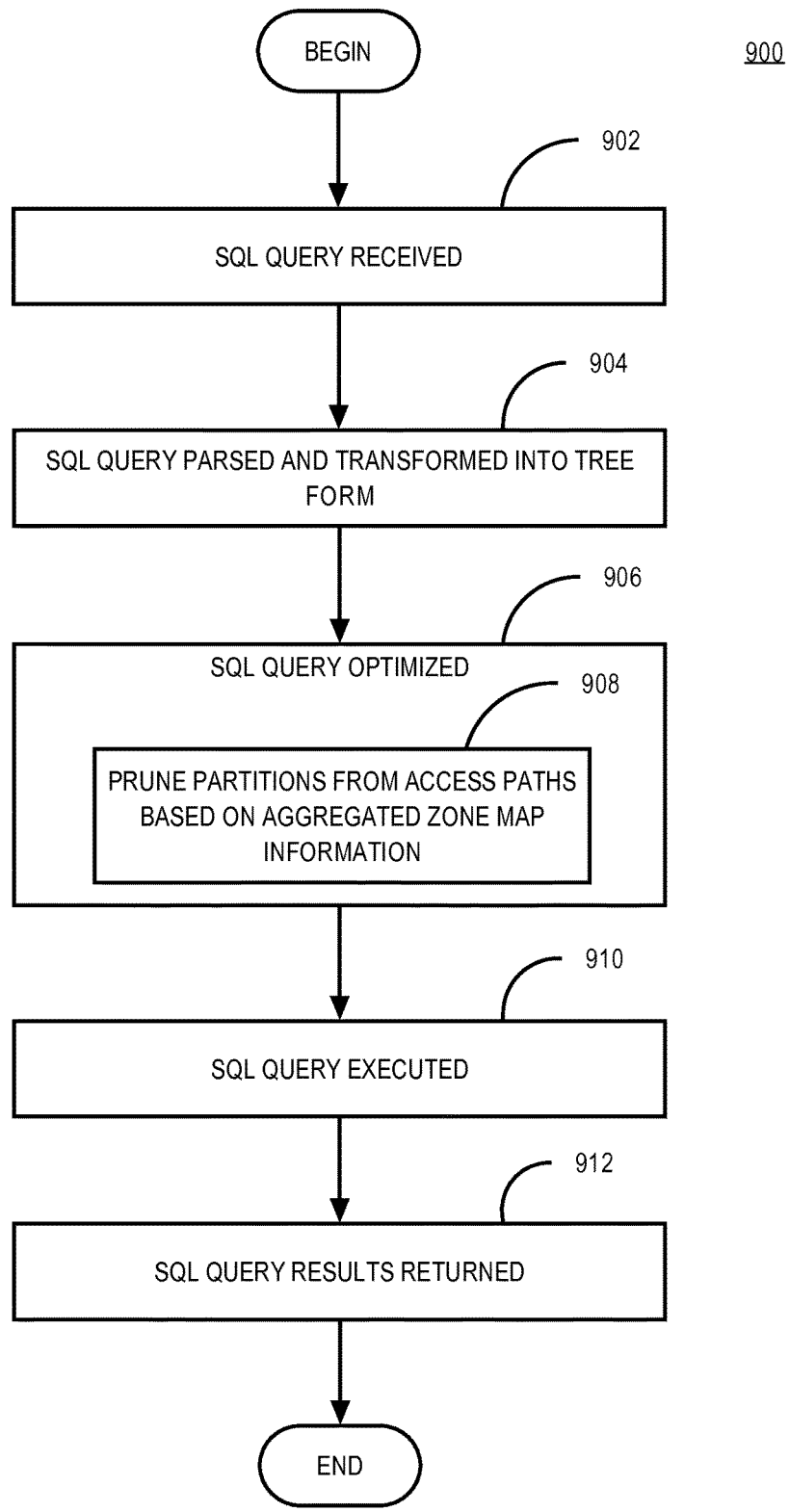
FIG. 9 comprises a flowchart illustrating high-level method steps of operation of some embodiments of the present invention in pruning partitions based on aggregated zone map information.

The operations of some embodiments of the present invention may be illustrated by example which describes the processing of a particular SQL query. For purposes of this discussion, the following example SQL query is used:

SELECT DISTINCT product_id FROM sales WHERE ship_date>TO_DATE('12-23-2012');

FIG. 9 comprises a flowchart 900 illustrating the high level method steps of operation of some embodiments of the present invention in processing a SQL query that requests (selects) data from a zoned and partitioned table and that contains at least one filter predicate on a zoned column for the zoned table (e.g., the above example SQL query). The zoned column need not be (but can be) a column of the zoned table (e.g., the zoned table can be a fact table in a star schema and the zoned column can be a column of a dimension table in the star schema). The filter predicate can be an equality predicate (e.g., ship_date=TO_DATE('12-23-2012'), a range predicate (e.g., ship_date>TO_DATE('12-23-2012')), a LIKE predicate (e.g., name LIKE 'John%')), or a IN-list predicate (e.g., status IN ('OPEN', 'CLOSED')).

At step 902, the SQL query is received. The above SQL query may, for instance, be received by the query engine of some embodiments of the present invention from a querier (e.g., a user or a computer application).

At step 904, the SQL query is parsed and transformed into tree form corresponding to the query. Step 904 may also involve normalizing the query tree into a normalized query tree form. Step 904 may involve checking the SQL query for correct syntax and performing a semantic analysis. For example, step 904 may involve verifying that database objects and object attributes referenced in the SQL query are correct.

At step 906, the most efficient way of producing the result of the SQL query is determined. The output of step 906 is a query execution plan that describes an optimum method of executing the SQL query. This optimization can include, among other things, evaluation of expressions and conditions in the SQL query and choosing access paths for obtaining table data. The output execution plan may reflect results of step 908 in which candidate partitions are pruned based on aggregated zone map information, if possible. The output execution plan may not identify any rows of zoned table that are stored in pruned partitions.

At step 908, any partitions of the partitioned and zoned table that can be pruned from the access paths based on the filter predicate and aggregated zone map information for the table are identified. For a given candidate partition of the table to prune, the column value (or range of possible column values) in the filter predicate is compared to the minimum and/or maximum values for the zoned column in the aggregated zone map information for the given partition. If, based on this comparison, the column value (or range of possible column values) in the filter predicate is outside of the value range established by the minimum and maximum values for zoned column for the candidate partition in the aggregated zone map information, then the candidate partition can be pruned from the access paths for executing the SQL query because no table data in the candidate partition can satisfy the filter predicate. For example, for a given candidate partition P of the sales table referenced in the above example SQL query, if the date value TO_DATE('12-23-2012') is after the maximum date value for the ship_date column in the aggregated zone information for partition P, then partition P can be pruned from the access paths for processing the above SQL query because no table data in partition P can satisfy the filter predicate ship_date>TO_DATE('12-23-2012'). The pruning can occur for table partitions and/or associated index partitions.

At step 910, the output execution plan associated with the SQL query is operated on and the results therefrom returned to the querier at step 912.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for pruning partitions based on aggregated zone map information comprising:
   receiving a query statement comprising a filter predicate on a column of a first database table; and
   pruning a particular table partition of a second database table from access paths for processing the query statement based on determining, based on aggregated zone map information associated with the particular table partition, that the query statement cannot be satisfied by data stored in the particular table partition, the aggregated zone map information comprising an aggregated minimum value for the column and an aggregated maximum value for the column, the aggregated minimum value being a smallest minimum value for the column among a plurality of minimum values for the column, the aggregated maximum value being a greatest maximum value for the column among a plurality of maximum values for the column, the plurality of minimum values for the column and the plurality of maximum values for the column associated with the column by a zone map on the second database table, the plurality of minimum values for the column and the plurality of maximum values for the column associated with a plurality of zones by the zone map, the plurality of zones comprising the data stored in the particular table partition.

2. The method of claim 1, wherein the determining, based on the aggregated zone map information, that the query statement cannot be satisfied by data stored in the particular table partition comprises:
comparing a value for the column in the filter predicate to the aggregated zone map information to determine whether the query statement cannot be satisfied by data stored in the particular table partition.

3. The method of claim 1, further comprising:
partitioning the second database table into at least the particular table partition based on values in one or more columns of a partitioning key;
wherein the column of the filter predicate is not one of the one or more columns of the partitioning key used to partition the second database table into at least the particular table partition.

4. The method of claim 1, further comprising:
generating and storing the aggregated zone map information by aggregating zone map information from a zone map generated for the second database table.

5. The method of claim 1, wherein the aggregated zone map information comprises an identifier of the particular table partition, a minimum column value for the column of the filter predicate, and a maximum column value for the column of the filter predicate.

6. The method of claim 1, further comprising:
generating a query plan for executing the query statement which does not comprise instructions for scanning table data stored in the particular table partition.

7. The method of claim 1, wherein the filter predicate is a first filter predicate; wherein the query statement comprises a second filter predicate on a second column of the second database table; wherein values in the second column in the particular table partition are indexed in a particular index partition associated with the particular table partition, the method further comprising:
pruning the particular index partition from access paths for processing the query statement based on determining, based on the aggregated zone map information associated with the particular table partition, that the query statement cannot be satisfied by data stored in the particular table partition.

8. The method of claim 1, wherein the first database table and the second database table are the same table.

9. The method of claim 1, wherein the first database table is a dimension table of a star schema and the second database table is a fact table of the star schema.

10. The method of claim 1, wherein the query statement comprises a plurality of filter predicates, the method further comprising:
pruning one or more particular table partitions of the second database table from access paths for processing the query statement based on determining, based on aggregated zone map information associated with the one or more particular partitions, that the query cannot be satisfied by data stored in any of the one or more particular table partitions.

11. A method for pruning partitions comprising:
receiving a query statement comprising a filter predicate on a column of a first database table, the filter predicate comprising a value for the column;
pruning a particular partition of a second database table from access paths for processing the query statement;
wherein the column of the filter predicate is not a column of a partitioning key used for partitioning the second database table; and
wherein the particular partition is identified as pruneable based at least on (a) aggregated zone map information associated with the particular partition and (b) the value for the column in the filter predicate.

12. The method of claim 11, wherein the first database table is a dimension table of a star schema and the second database table is a fact table of the star schema.

13. The method of claim 11, wherein the first database table and the second database table are the same table.

14. One or more non-transitory computer-readable media storing instructions which, when executed by one or more computing devices, cause the one or more computing devices to perform operations comprising:
receiving a query statement comprising a filter predicate on a column of a first database table; and
pruning a particular table partition of a second database table from access paths for processing the query statement based on determining, based on aggregated zone map information associated with the particular table partition, that the query statement cannot be satisfied by data stored in the particular table partition, the aggregated zone map information comprising an aggregated minimum value for the column and an aggregated maximum value for the column, the aggregated minimum value being a smallest minimum value for the column among a plurality of minimum values for the column, the aggregated maximum value being a greatest maximum value for the column among a plurality of maximum values for the column, the plurality of minimum values for the column and the plurality of maximum values for the column associated with the column by a zone map on the second database table, the plurality of minimum values for the column and the plurality of maximum values for the column associated with a plurality of zones by the zone map, the plurality of zones comprising the data stored in the particular table partition.

15. The one or more non-transitory computer-readable media of claim 14, wherein the determining, based on the aggregated zone map information, that the query statement cannot be satisfied by data stored in the particular table partition comprises:
comparing a value for the column in the filter predicate to the aggregated zone map information to determine whether the query statement cannot be satisfied by data stored in the particular table partition.

16. The one or more non-transitory computer-readable media of claim 14, the operations further comprising:
partitioning the second database table into at least the particular table partition based on values in one or more columns of a partitioning key;
wherein the column of the filter predicate is not one of the one or more columns of the partitioning key used to partition the second database table into at least the particular table partition.

17. The one or more non-transitory computer-readable media of claim 14, the operations further comprising:
generating and storing the aggregated zone map information by aggregating zone map information from a zone map generated for the second database table.

18. The one or more non-transitory computer-readable media claim 14, wherein the aggregated zone map information comprises an identifier of the particular table partition, a minimum column value for the column of the filter predicate, and a maximum column value for the column of the filter predicate.

19. The one or more non-transitory computer-readable media claim 14, the operations further comprising:
generating a query plan for executing the query statement which does not comprise instructions for scanning table data stored in the particular table partition.

20. The one or more non-transitory computer-readable media claim 14, wherein the filter predicate is a first filter predicate; wherein the query statement comprises a second filter predicate on a second column of the second database table; wherein values in the second column in the particular table partition are indexed in a particular index partition associated with the particular table partition, the operations further comprising:
pruning the particular index partition from access paths for processing the query statement based on determining, based on the aggregated zone map information associated with the particular table partition, that the query statement cannot be satisfied by data stored in the particular table partition.

21. The one or more non-transitory computer-readable media of claim 14, wherein the first database table and the second database table are the same table.

22. The one or more non-transitory computer-readable media of claim 14, wherein the first database table is a dimension table of a star schema and the second database table is a fact table of the star schema.

23. One or more non-transitory computer-readable media storing instructions which, when executed by one or more computing devices, cause the one or more computing devices to perform operations comprising:
receiving a query statement comprising a filter predicate on a column of a first database table, the filter predicate comprising a value for the column;
pruning a particular partition of a second database table from access paths for processing the query statement;
wherein the column of the filter predicate is not a column of a partitioning key used for partitioning the second database table; and
wherein the particular partition is identified as pruneable based at least on (a) aggregated zone map information associated with the particular partition and (b) the value for the column in the filter predicate.

24. The one or more non-transitory computer-readable media of claim 23, wherein the first database table is a dimension table of a star schema and the second database table is a fact table of the star schema.

25. The one or more non-transitory computer-readable media of claim 23, wherein the first database table and the second database table are the same table.

26. A system for pruning partitions based on aggregated zone map information, the system comprising:
a computer having at least a processor and memory;
a query engine for receiving a query statement comprising a filter predicate on a column of a database table; and
a query engine optimizer module for pruning one or more partitions associated with a database table from access paths for processing the query statement based on determining, based on aggregated zone map information associated with the particular table partition, that the query statement cannot be satisfied by data stored in the particular table partition, the aggregated zone map information comprising an aggregated minimum value for the column and an aggregated maximum value for the column, the aggregated minimum value being a smallest minimum value for the column among a plurality of minimum values for the column, the aggregated maximum value being a greatest maximum value for the column among a plurality of maximum values for the column, the plurality of minimum values for the column and the plurality of maximum values for the column associated with the column by a zone map on the second database table, the plurality of minimum values for the column and the plurality of maximum values for the column associated with a plurality of zones by the zone map, the plurality of zones comprising the data stored in the particular table partition.

27. A system for pruning partitions, the system comprising:
a computer having at least a processor and memory;
a query engine for receiving a query statement comprising a filter predicate on a column of a first database table, the filter predicate comprising a value for the column;
a query engine optimizer module for pruning partitions of a second database table from access paths for processing the query statement based at least on the value for the column in the filter predicate;
wherein the column of the filter predicate is not a column of a partitioning key used for partitioning the second database table; and
wherein the partitions of the second database table are identified as pruneable based at least on (a) aggregated zone map information associated with the partitions and (b) the value for the column in the filter predicate.

* * * * *

UNITED STATES PATENT AND TRADEMARK OFFICE
CERTIFICATE OF CORRECTION

PATENT NO. : 9,507,825 B2  
APPLICATION NO. : 14/245909  
DATED : November 29, 2016  
INVENTOR(S) : Baer et al.

Page 1 of 1

It is certified that error appears in the above-identified patent and that said Letters Patent is hereby corrected as shown below:

In the Claims

In Column 19, Line 7, in Claim 18, after "media" insert -- of --.

In Column 19, Line 13, in Claim 19, after "media" insert -- of --.

In Column 19, Line 18, in Claim 20, after "media" insert -- of --.

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*